Dec. 14, 1948.  J. J. HOFFMAN  2,456,124
APPARATUS FOR AND METHOD OF TREATING FOOD PRODUCTS
Filed Aug. 10, 1943  2 Sheets-Sheet 1

INVENTOR
JOHN J. HOFFMAN.
BY
ATTORNEYS

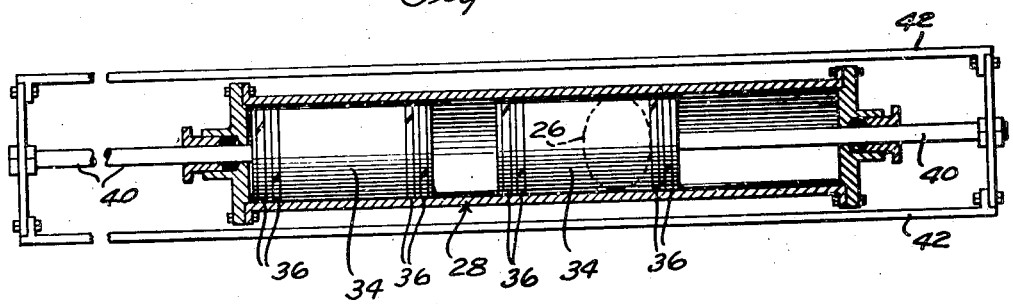
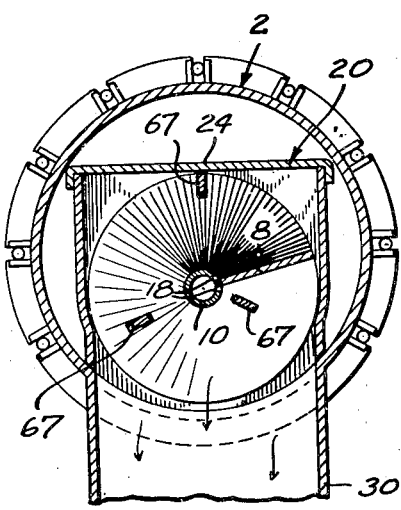
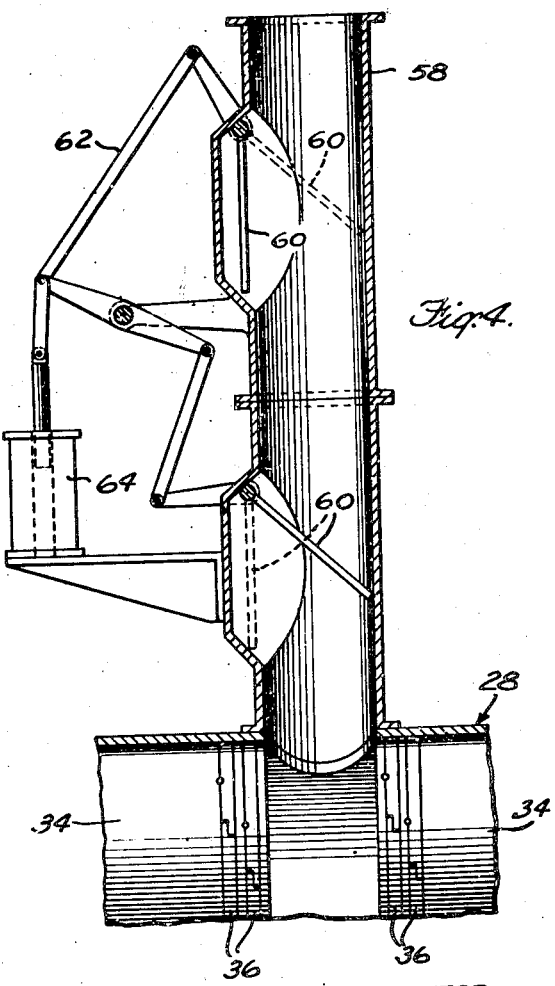

Patented Dec. 14, 1948

2,456,124

UNITED STATES PATENT OFFICE 2,456,124

APPARATUS FOR AND METHOD OF TREATING FOOD PRODUCTS

John J. Hoffman, Point Pleasant, N. Y., assignor to Beech-Nut Packing Company, Canajoharie, N. Y., a corporation of New York Application August 10, 1943, Serial No. 498,045

3 Claims. (Cl. 62—114)

The present invention relates to apparatus for treating products, particularly vegetables and other food products, and has special reference to apparatus that is adapted for use in blanching, cooking, peeling, and freezing vegetables, and other food products. The invention further relates to a novel and improved method of freezing such products.

The object of the invention is to provide novel and improved method and apparatus of this character.

The invention is illustrated, by way of example, in the accompanying drawings, in which:

Fig. 2 is a longitudinal sectional plan view on an enlarged scale taken substantially on the line 2—2 of Fig. 1;

Fig. 3 is a transverse sectional view on an enlarged scale, taken on the line 3—3 of Fig. 1; and Fig. 4 is a vertical sectional view, partly in elevation, of a device that may be employed in controlling the feed of the material to the treating chamber of the apparatus.

Figure 1:
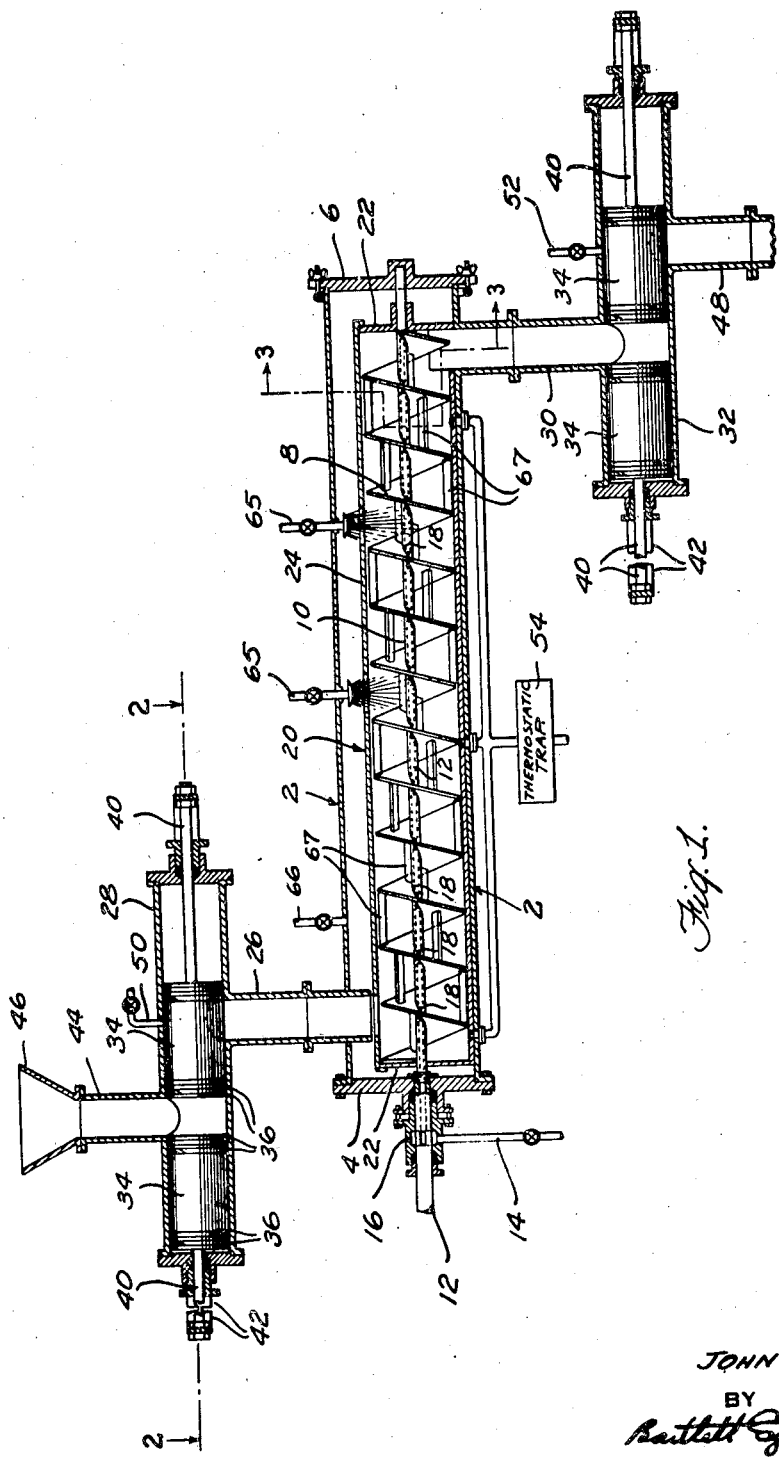
Figure 1 is a longitudinal sectional view, partly in elevation, and partly diagrammatical, of the preferred form of the apparatus.

As shown, the apparatus is provided with an elongated treating chamber 2 which may be cylindrical. One end of this chamber is closed by a wall or cover 4, and its other end by a cover 6 which is removable.

A screw conveyor 8 is mounted in the chamber for conveying material longitudinally thereof. This screw conveyor has a shaft 10 which has one end journaled in a bearing in the removable cover 6, and has its other end detachably coupled to a driving shaft 12. The conveyor shaft 10 is made tubular, and steam may be directed therethrough from a steam pipe 14 which leads into a steam box 16 surrounding the driving shaft 12, and leading into the said end of the conveyor shaft 10, the other end of the conveyor shaft being closed.

The conveyor shaft 10 is provided with perforations 18 for directing steam into the steam chamber, the perforations being so arranged as to cause steam to be directed over the front sides of the blade of the conveyor.

Within the chamber 2 there is a trough 20, the lower portion of which is semi-circular to receive the screw conveyor. The trough is provided with end walls 22 and a removable top cover 24. The screw conveyor, trough and cover may be made of stainless steel.

With this construction upon removal of the end cover 6 of the steam pressure chamber 2, the screw conveyor and the trough 20 may be removed from the chamber, and the cover 24 removed from the trough, so as to permit these parts to be easily cleaned and replaced.

The steam chamber 2 is provided with an inlet opening in the top part of one end thereof which is in communication through a vertical cylindrical conduit 26 with the outlet opening of a horizontal cylinder 28. The cover 24 of the trough 20 has an opening in alinement with the conduit 26 so as to permit material to be dropped down through said conduit and on to the rear end of the screw conveyor and into said trough 20.

The underside of the front end of the steam chamber 2 is provided with an outlet opening which leads down through a conduit 30 into a horizontal cylinder 32, an opening being provided in the bottom of the trough 20 in alinement with this conduit 30.

In each of the cylinders 28 and 32 there is mounted two pistons 34 which have their inner ends spaced apart.

The pistons are provided with piston rings 36 to form a tightly sliding fit between the pistons and the cylinder. The pistons in each cylinder are connected to move together by means of piston rods 40 which are connected to the crossbars of a frame 42 that may be operated by means of a crank, or in any other manner, to reciprocate the pistons.

The cylinder 28 is provided with an inlet opening which, through a cylindrical conduit 44, is in communication with a hopper 46.

The lower cylinder 32 is provided with an outlet opening which leads into a cylindrical conduit 48 through which the material from the apparatus may be discharged.

The space between the inner ends of the pistons of the cylinder 28 is less than the distance between the inlet conduit 44 and the outlet cylindrical conduit 26 of said cylinder. The space between the ends of the pistons of the cylinder 32 is less than the distance between the inlet cylindrical conduit 30 and the discharge conduit 48.

The cylinder 28 is provided with a steam inlet 50 in alinement with the conduit 26, and the cylinder 32 is provided with a water inlet 52 in alinement with the discharge conduit 48.

A thermostatic trap 54 of suitable construction is connected with the bottom of the steam chamber 2.

In the use of the apparatus for blanching or other steam treatment, the air is purged from the apparatus by venting as through the valve-controlled vent or suction line 66 hereinafter described. The food products to be blanched, such as beets and potatoes, after being cut into small pieces or diced are supplied to the hopper 46.

When the pair of pistons in the cylinder 28 are in the position shown in Fig. 1 with the space between the ends of the pistons in alinement with the conduit 44, the diced food is free to drop down between the pistons. Upon forward movement of the pistons, the lower end of the conduit 44 is closed by the rear piston, and the batch of food between the pistons is conveyed to a position above the conduit 26. When the pistons reach this position, the steam inlet 50 is opened so as to cause the steam to force the material down through the conduit. The pistons then return to receive the next charge of food from the conduit 44.

During this movement of the pistons 28, the piston rings effectively prevent the escape of steam from the steam chamber.

During the feeding through the steam chamber of the batches of food thus supplied thereto, the pressure in the steam chamber is maintained by the admission of steam through the steam supply pipe 14. By admitting the steam into the chamber through the perforations 18, arranged adjacent the sides of the blade of the screw conveyor, the material is prevented from sticking to the blade, and the individual pieces of food are uniformly subjected to the steam as they are rolled or otherwise agitated by the screw conveyor while being fed through the chamber.

When the food reaches the outlet opening of the steam chamber, it drops down through the conduit 30 into the space between the pistons in the cylinder 32. Upon forward movement of the pistons thereafter, this charge of food is carried beneath the water inlet 52 where water is sprayed over it to effect quick cooling and to force it down through the discharge conduit 48. As the space between the pistons is of less width than the distance between the inlet and the outlet openings of the cylinder 32, the piston rings effectively prevent the escape of steam from the forward end of the steam chamber.

It will be apparent from the foregoing that any desired steam pressure may be maintained in the steam chamber 24 as may be required for blanching, cooking, or peeling, and this is accomplished without any material loss of steam.

In using the apparatus for peeling such products as beets and potatoes, the device illustrated in Fig. 4 may be employed in place of the pipe 44 for conducting material from the hopper 46 to the cylinder 28. As shown this device comprises a conduit 58 which has two dampers or gates 60 hingedly mounted therein one above the other. The gates are adapted to be operated simultaneously to move one into closed position and the other into open position alternately through a suitable arrangement of links and levers 62 which may be operated by a solenoid 64.

When the upper gate 60 is open, the beets or potatoes are adapted to drop down upon the lower gate 60. As the lower gate opens, the upper gate closes to permit the measured quantity of the articles between the two gates to drop down between the pistons, this measured quantity of articles being less than sufficient to fill the space between the pistons. This insures against any of the beets or potatoes projecting above the inlet opening of the cylinder, and thus prevents shearing or otherwise mutilating of the potatoes by the operation of the pistons.

It will be apparent that my improved apparatus insures proper treatment of the products in a minimum length of time and with the use of a minimum amount of steam, and uniform results are insured.

In using the apparatus for freezing, the steam and water supplies above described are shut off and the chamber 2 disconnected from the steam trap 54. The chamber 2 is then connected with a vacuum line 66 which creates a sufficiently high vacuum in the chamber 2 to insure proper freezing.

The pieces of material may be supplied to the chamber 2 from the hopper 46 by operation of the piston 34 in the same manner as above described in the case of blanching, cooking and peeling, and likewise the material after passing through the treating chamber 2 may be discharged in the same manner as in the case of those other treating operations.

Also, it will be apparent that the pistons effectively prevent leakage of air into the chamber 2 during the operation of the apparatus.

During the feeding of the material through the treating chamber, the pieces of material, such as peas or beans, are continuously rolled or otherwise agitated in a sufficiently thin layer to cause all their surfaces to be uniformly subjected to the vacuum, and the pieces are individually frozen and separately discharged from the treating chamber. This insures uniform freezing of the individual pieces, and the freezing operation is accomplished in a minimum length of time. Moreover, the individual freezing of the pieces results in the product being more like the fresh product.

The operation of thus vacuum freezing the products, causes a certain amount of dehydration. This may add to the keeping qualities of certain products, and also has the advantage of lessening the weight of the material, which is an important item in shipping large quantities of a product in bulk. In case it is desired to increase the moisture content of the product, this may be done by spraying water over the material as it passes through the vacuum chamber. To provide for this a plurality of spaced valve-controlled water supply nozzles 65 are adapted to spray water into the interior of the chamber 2 and through openings in the cover of the trough 22.

The frozen material discharged from the apparatus through the conduit 48 may be placed in suitable containers for shipment to the canning factory, or dehydrating plant, for further processing, or may be placed in small packages as desired.

While other devices may be employed for feeding the material through the treating chamber, the screw conveyor provides the most effective means so far devised as it at all times tends to uniformly roll and agitate the pieces of the material so as to uniformly expose their entire surfaces to the vacuum. In order to increase the agitating or turning over of the pieces of material during the feeding thereof through the treating chamber, the flights of the screw conveyor 8 are preferably connected by flat bars 67. When the conveyor is in motion, the bars 67 tend to move the pieces of material from the bottom and part way up the side of the conveyor trough, and in falling back the pieces will mix with the other pieces. Thus both the upward and forward motions imparted by the conveyor cause turning over and agitation of the product.

As will be evident to those skilled in the art, my invention permits various modifications without departing from the spirit thereof or the scope of the appended claims.

What I claim is:

1. In an apparatus for treating material of the class described, a chamber having an inlet opening in the top side of one end and an outlet opening in the bottom side of its other end, means for conveying material through said chamber, the material being admitted through said inlet opening and discharged through said outlet opening, a conduit extending upwardly from said inlet opening, a conduit extending downwardly from said outlet opening, a cylinder having an opening leading into the upper end of said inlet conduit, a second cylinder having an opening into which leads the lower end of said discharge conduit, an inlet opening in the first mentioned cylinder and an outlet opening in the second mentioned cylinder, pistons mounted for reciprocating movement in each of said cylinders, the pistons in each cylinder having their inner ends spaced apart, and means for reciprocating said pistons whereby the pistons in the first mentioned cylinder are adapted to receive between them material entering the associated cylinder through the inlet opening therein, and to discharge the material through the outlet opening in the cylinder, said inlet and outlet openings in each cylinder being spaced apart a distance greater than the space between the ends of the pistons.

2. The method of freezing pieces of material which comprises feeding the material through a chamber, agitating the pieces of material as they are being fed, spraying water over the pieces of material while they are being fed, and maintaining a sufficiently high vacuum in the chamber to effect freezing of the pieces as they pass through the chamber.

3. The method of freezing pieces of material which comprises passing the material through a chamber, agitating the pieces of material as they pass through the chamber, applying moisture to the pieces of material while they are thus passing through the chamber, and maintaining a sufficiently high vacuum in the chamber to effect freezing as the pieces pass through the chamber.

JOHN J. HOFFMAN.

REFERENCES CITED

The following references are of record in the file of this patent:

UNITED STATES PATENTS

| Number | Name | Date |
|---|---|---|
| 854,159 | Fraser | May 21, 1907 |
| 959,448 | Baxter | May 31, 1910 |
| 1,069,507 | Wilson | Aug. 5, 1913 |
| 1,230,811 | Shippee | June 19, 1917 |
| 1,396,859 | Long | Nov. 15, 1921 |
| 1,884,429 | Warner | Oct. 25, 1932 |
| 1,933,257 | Goosmann | Oct. 31, 1933 |
| 1,940,164 | Comer | Dec. 19, 1933 |
| 1,944,857 | Atwell | Jan. 23, 1934 |
| 2,100,151 | Tietz | Nov. 23, 1937 |
| 2,162,213 | Conn | June 13, 1939 |
| 2,182,556 | Griswold | Dec. 5, 1939 |
| 2,302,169 | Baker | Nov. 17, 1942 |
| 2,304,192 | Newton | Dec. 8, 1942 |
| 2,411,152 | Folsom | Nov. 19, 1946 |